United States Patent [19]
Liu

[11] Patent Number: 5,214,766
[45] Date of Patent: May 25, 1993

[54] DATA PREFETCHING BASED ON STORE INFORMATION IN MULTI-PROCESSOR CACHES

[75] Inventor: Lishing Liu, Pleasantville, N.Y.

[73] Assignee: International Business Machines Corporation, Armonk, N.Y.

[21] Appl. No.: 933,003

[22] Filed: Aug. 19, 1992

Related U.S. Application Data

[63] Continuation of Ser. No. 344,639, Apr. 28, 1989, abandoned.

[51] Int. Cl.$^5$ .................... G06F 13/00; G06F 12/00; G06F 12/08
[52] U.S. Cl. .................... 395/425; 364/DIG. 1; 364/243.41; 364/243.44; 364/263.1; 364/264; 364/264.4; 364/230.6
[58] Field of Search .................... 395/425; 364/DIG. 1

[56] References Cited

U.S. PATENT DOCUMENTS

| | | | |
|---|---|---|---|
| 3,618,040 | 11/1971 | Iwamoto et al. | 364/200 |
| 4,142,234 | 2/1979 | Bean et al. | 364/DIG. 1 |
| 4,370,645 | 1/1983 | Cason et al. | 340/709 |
| 4,394,731 | 7/1983 | Flusche et al. | 364/200 |
| 4,467,421 | 8/1984 | White | 364/200 |
| 4,489,378 | 12/1984 | Dixon et al. | 364/200 |
| 4,507,656 | 3/1985 | Morey et al. | 340/739 |
| 4,638,431 | 1/1987 | Nishimura | 364/DIG. 1 |
| 4,980,823 | 12/1990 | Liu | 364/200 |
| 5,016,168 | 5/1991 | Liu | 364/DIG. 1 |
| 5,018,063 | 5/1991 | Liu | 364/DIG. 1 |

FOREIGN PATENT DOCUMENTS 0062165 4/1982 European Pat. Off. .

OTHER PUBLICATIONS

"IBM Technical Disclosure Bulletin"; vol. 27, No. 5, Oct. 1984; L. Liu et al.; History Overflow Mechanism, pp. 3001-3002.
IBM Technical Disclosure Bulletin, vol. 27, No. 2, Jul. 1984; "Early Store-Through of XI-Sensitive Data"; J. W. Knight et al.; pp. 1073-1074.
"IBM 3081 Processor Unit: Design Considerations and Design Process"; IBM Journal of Research and Development; vol. 26, 1982, No. 1, R. N. Gustafson et al.; pp. 12-21.

*Primary Examiner*—Eddie P. Chan
*Attorney, Agent, or Firm*—Whitham & Marhoefer

[57] ABSTRACT

A mechanism using $CH_{Loc}$ (change-local) type information is used for data prefetch (D-prefetch) decision making. This information is stored in history tables H, there being one such table for each central processor (CP) at, for example, the buffer control element (BCE). For each line L, H[L] indicates the information for L in H. Two different types of histories may be kept at H:

(1) Cross-interrogate (XI)-invalidates—At each H[L], there is recorded whether L was XI-invalidated without refetching.

(2) $CH_{Loc}$—At each H[L], there is also recorded local-change history, i.e., whether L was stored into since the last fetch.

It is also possible to keep a global H at the storage control element (SCE). In this case, the SCE maintains a table I recording, for each line L, information I[L] recording whether L involved XI-invalidates during the last accesses by a CP. Upon a cache miss to L from a processor $CP_i$, the SCE prefetches some of those lines that involved XI-invalidates (indicated by I) into cache $C_i$, if missing there. The management of table I is simple. When an XI-invalidate on L occurs, e.g., upon a store or an EX fetch, the corresponding entry is set. When L is accessed, e.g., upon D-fetch misses, without XI-invalidate, the entry in I is reset. Another criteria for turning an I entry OFF is when the line is fetched, e.g., on demand or upon prefetch.

17 Claims, 4 Drawing Sheets

| k | $M_k$ | $M_k^{IF}$ | $M_k^{IF}$ | $M_k^{DF}$ | $M_k^{DS}$ |
|---|---|---|---|---|---|
| 1 | 44.7 | 105.2 | 104.0 | 109.4 | 277.9 |
| 2 | 33.4 | | 105.6 | 67.9 | 173.8 |

FIG. 4

| k | $M_k$ | $M_k^{IF}$ | $M_k^{DF}$ | $M_k^{DS}$ | $\Delta_2(M)$ |
|---|---|---|---|---|---|
| 2 | 37.8 | 105.2 | 81.3 | 210.2 | 243.8 |

FIG. 6

| T | $M_k$ | $M_k^{IF}$ | $M_k^{DF}$ | $M_k^{DS}$ | $\Delta_2(M)$ |
|---|---|---|---|---|---|
| 3 | 38.5 | 105.6 | 82.9 | 223.8 | 273.6 |
| 4 | 39.6 | 105.4 | 86.8 | 233.7 | 341.1 |

DATA PREFETCHING BASED ON STORE INFORMATION IN MULTI-PROCESSOR CACHES

CROSS-REFERENCE TO RELATED APPLICATIONS

This is a continuation of U.S. patent application Ser. No. 07/344,639, filed Apr. 28, 1989, abandoned, priority of which is claimed under 35 U.S.C. §120.

DESCRIPTION

BACKGROUND OF THE INVENTION

1. Field of the Invention

This invention generally relates to techniques for reducing data misses in large cache memories in a multi-processor (MP) data processing system and, more particularly, to mechanisms for data prefetching in multi-processor caches based on store information.

2. Description of the Prior Art

High performance, MP computer systems are being developed to increase throughput by performing in parallel those operations which can run concurrently on separate processors. Such high performance, MP computer systems are characterized by multiple central processor (CPs) operating independently and in parallel, but occasionally communicating with one another or with a main storage (MS) when data needs to be exchanged. The CPs and the MS have input/output (I/O) ports which must be connected to exchange data.

In the type of MP system known as the tightly coupled multi-processor system in which each of the CPs have their own caches, there exist coherence problems at various levels of the system. More specifically, inconsistencies can occur between adjacent levels of a memory hierarchy. The multiple caches could, for example, possess different versions of the same data because one of the CPs has modified its copy. It is therefore necessary for each processor's cache to know what has happened to lines that may be in several caches at the same time. In a MP system where there are many CPs sharing the same main storage, each CP is required to obtain the most recently updated version of data according to architecture specifications when access is issued. This requirement necessitates constant monitoring of data consistency among caches.

A number of solutions have been proposed to the cache coherence problem. Early solutions are described by C. K. Tang in "Cache System Design in the Tightly Coupled Multiprocessor System", *Proceedings of the AFIPS* (1976), and L. M. Censier and P. Feautrier in "A New Solution to Coherence Problems in Multicache Systems", *IEEE Transactions on Computers*, Dec. 1978, pp. 1112 to 1118. Censier et al. describe a scheme allowing shared writable data to exist in multiple caches which uses a centralized global access authorization table. However, as the authors acknowledge in their Conclusion section, they were not aware of similar approaches as described by Tang two years earlier. While Tang proposed using copy directories of caches to maintain status, Censier et al. proposed to tag each memory block with similar status bits.

A typical approach to multi-processor (MP) cache coherence is as follows. When a processor needs to modify (store into) a cache line, it makes sure that copies of the line in remote caches are invalidated first. This is achieved either by broadcasting the store signal to remote processors (for instance, through a common bus connecting all processors) or by requesting for permission from a centralized storage function (for instance, the storage control element (SCE) in IBM 3081 systems). The process of invalidating a cache line that may or may not exist in remote processor caches is called cross-interrogate invalidate (XI-invalidate). There have been various design techniques proposed for the reduction of such XI-invalidate signals. For example, in IBM/3081 systems, exclusivity (EX) states at processor caches are used to record the information that the associated lines are not resident in remote caches and do not require XI-invalidate activities when stored into from the caches owning the exclusivity states.

One inherent overhead in conventional MP cache designs is the extra misses due to XI-invalidates. That is, a processor access to its cache may find the line missing, which would not have occurred if not XI-invalidated by a remote processor before the access. This problem is becoming more serious when large caches are used with more central processors (CPs). Simulation results indicate that such extra misses are mostly on data lines (D-lines), as opposed to instruction lines (I-lines). With large caches, miss ratios are rather satisfactory in a uni-processor (UP) environment. To reduce the extra misses due to remote stores, one approach is to prefetch D-lines that are potentially invalidated by remote CPs.

SUMMARY OF THE INVENTION

It is therefore an object of the present invention to provide mechanisms for data prefetching in MP caches based on store information thereby achieving a significant reduction on data misses in MPs with large caches.

According to the invention, a mechanism using history information is used for data prefetch (D-prefetch) decision making. This information is stored in history tables H, there being one such table for each CP at, for example, the buffer control element (BCE). For each line L, H[L] indicates the information for L in H. Two different types of histories may be kept at H:

(1) XI-invalidates—At each H[L], there is recorded whether L was XI-invalidated without refetching.

(2) $CH_{Loc}$—At each H[L], there is also recorded change-local history, i.e., whether L was stored into since the last fetch.

It is also possible to keep a global H at the storage control element (SCE). In this case, the SCE maintains a table I recording, for each line L, information I[L] recording whether L involved XI-invalidates during the last accesses by a CP. Upon a cache miss to L from a processor $CP_i$, the SCE prefetches some of those lines that involved XI-invalidates (indicated by I) into cache $C_i$, if missing there. The management of table I is simple. When an XI-invalidate on L occurs, e.g., upon a store or an EX fetch, the corresponding entry is set. When L is accessed, e.g., upon D-fetch misses, without XI-invalidate, the entry in I is reset. Another criteria for turning an I entry OFF is when the line is fetched, e.g., on demand or upon prefetch.

BRIEF DESCRIPTION OF THE DRAWINGS

The foregoing and other objects, aspects and advantages of the invention will be better understood from the following detailed description of a preferred embodiment of the invention with reference to the drawings, in which.

DETAILED DESCRIPTION OF A PREFERRED EMBODIMENT OF THE INVENTION

Figure 1:
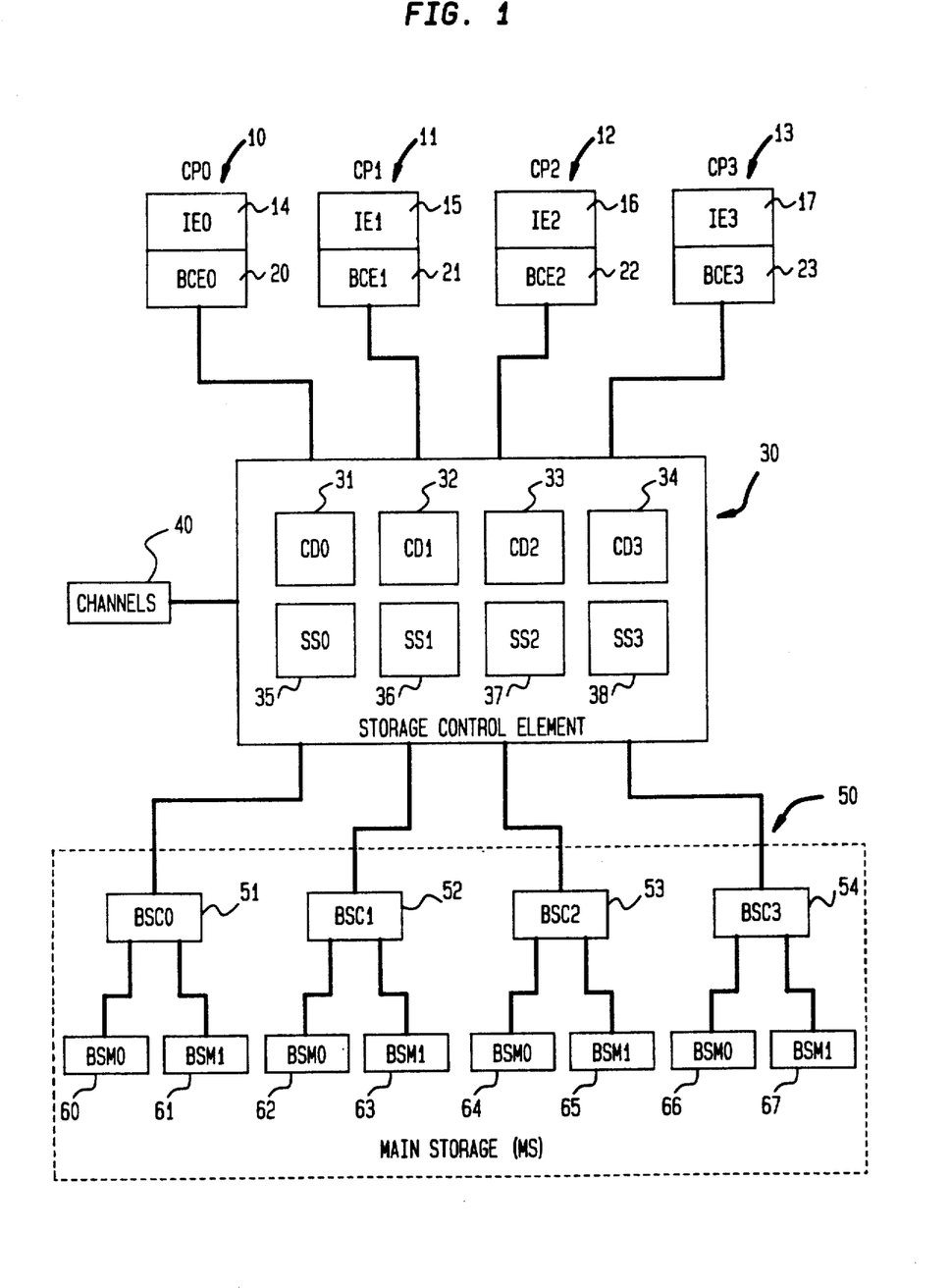
FIG. 1 is a block diagram of a multi-processor system in which the present invention may be used.

Referring now to the drawings, and more particularly to FIG. 1, there is illustrated in block diagram form a multi-processor (MP) system of the type in which the invention may be used. The MP system comprises four central processors ($CP_0$, $CP_1$, $CP_2$, and $CP_3$) 10, 11, 12, and 13 in which each CP includes an instruction execution (IE) unit 14, 15, 16, and 17 and buffer control unit (BCE) 20, 21, 22, and 23, respectively. Each IE unit includes hardware and microcode that issue instructions that require the fetching and storing of operands in main storage (MS) 50.

The IE units 14 to 17 begin a fetching or storing operation by issuing a fetch or store command to their respective cache controls BCEs 20 to 23, which include a processor store through (ST) cache with its associated processor cache directory (PD) and all processor cache controls which are exclusively used by their associated CPs 10 to 13. The CP generally issues a fetch or store command for each doubleword (DW) unit required by an operand. If the cache line containing the DW is in the PD, which is a cache hit, the DW is fetched or stored in the cache in accordance with the command. For an operand fetch hit in cache, the storage access is completed without any need to go outside of the BCE. Occasionally, the required DW is not in the cache, which results in a cache miss. Before the IE fetch or store command can be completed, the DW must be fetched from the main storage. To do this, the BCE generates a corresponding fetch or store miss command which requests the storage control element (SCE) 30 to obtain from main storage 50 a line unit of data having the DW required by the IE unit. The line unit will be located in the main storage 50 on a line boundary, but the required DW will be the first DW in the fetched line to be returned to the requesting BCE in order to keep the IE request going before the completion of the missed line transfer.

SCE 30 connects to the CPs 10 to 13 and main storage 50. Main storage 50 is comprised of a plurality of basic storage module (BSM) controllers $BSC_0$, $BSC_1$, $BSC_2$, and $BSC_3$ (51, 52, 53, and 54, respectively) in which each basic storage controller connects to two BSMs 0 (60, 62, 64, and 66) and 1 (61, 63, 65, and 67). The four BSCs 51 to 54 are each connected to the SCE 30. In prior systems, the SCE 30 contains four copy directories (CDs) 31, 32, 33, and 34, each containing an image of the contents of a corresponding processor cache directory (PD) in one of the BCEs in a manner similar to that described in Flusche et al U.S. Pat. No. 4,394,731.

A doubleword wide bidirectional data bus is provided between each BSM 60 to 67 in main storage and corresponding SCE port, and from SCE ports to I/O channel processor 40 and each of the corresponding CPs 10 to 13. Along with the data busses, there are also separate sets of command busses for control and address signals. When a CP encounters a cache miss for a DW access request, its BCE initiates a line access request to main storage by sending a miss command to SCE 30, which then reissues the command to a required BSM in main storage. In the event of a BSM busy condition, SCE 30 will save the request in a command queue and will reissue it at a later time when the required BSM 60 to 67 becomes available. SCE 30 also sequences the main storage commands in an orderly fashion so that all commands to a particular BSM are issued in first-in, first-out (FIFO) order, except when a cache conflict is found by its XI logic. During the normal sequence of handling a main storage request, SCE 30 constantly monitors the status of main storage, analyzes the interrogation results of protection key and all cache directories, examines updated status of all pending commands currently being held in SCE 30, and also looks for any new BCE commands that may be waiting in BCE 20 to 23 to be received by SCE 30.

SCE 30 maintains a plurality of store stacks ($SS_0$, $SS_1$, $SS_2$, and $SS_3$) 35, 36, 37, and 38, each for holding of main storage store requests of up to 16 DWs for a corresponding CP. SCE 30 keeps enough directory information for the store stacks for the indication of main storage addresses and validity. When a store stack risks overflow, SCE 30 sends a priority request to the associated BCE 20 to 23 to hold the sending of more store requests until the BCE receives a later signal from SCE 30 clearing the store stack full condition. Data in the store stacks are updated to main storage with appropriate scheduling maintaining the incoming order within each store stack. A line fetch request from a CP is held by SCE 30 until the SCE makes sure that all existing stores to the line in the store stacks have been sent to the associated BSM 60 to 67.

One inherent overhead in conventional MP cache designs is the extra misses due to XI-invalidates. When a line is stored by one processor, copies of the line need to be invalidated from remote caches at the proper point. For a given cache design and a given workload, let $m_k$ be the number of instructions per occurrence that a reference does not find the line in local cache in a k-way MP configuration. Hence $m_l$ may be considered as the uni-processor (UP) miss behavior without MP effects. Let $$\Delta_k(m) = \frac{1}{\frac{1}{m_k} - \frac{1}{m_l}}$$

be the number of instructions per extra misses in a k-way MP (as compared with a UP) system due to XI-invalidates. In a later discussion, superscripts are used to denote the behavior for specific reference types. For example, $m_k^{DF}$ denotes the number of instructions per D-Fetch cache miss in a k-way MP system. Experiments have shown that such extra misses were mainly on D-lines. When cache size grows or when more processors are added, such extra misses will have a higher percentage on MPs. For instance, in certain environments, extra miss ratios alone may cost over 4% of system performance. Also, experimental data shows that almost all of such extra cache misses are covered by data lines, since processors rarely store into instruction lines.

One way for reducing such overhead due to extra misses is data prefetching. It is clear that the concerned extra misses result only due to XI-invalidates; therefore, prefetching may be carried out on XI-invalidate histories. Comparing this approach with more general data prefetching schemes, it has the following advantages:

(1) Data prefetching in general is not as effective as instruction prefetching (I-prefetching). More general D-prefetching may result in excessive burden to the control functions and to the memory traffic. Performing D-prefetching only on XI-invalidate related activities will cut down prefetching frequencies, with better prefetching behavior.

(2) Effective D-prefetching involves histories. XI related histories are useful for MP system design and, therefore, XI histories provide benefit not limited to D-prefetching.

Figure 7:
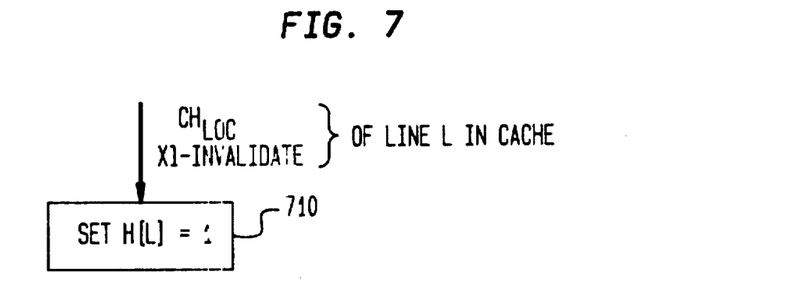
FIG. 7 illustrates storage of history information in a history table.

Consider first history tables H provided for D-prefetch decision making. There is one such table for each CP (e.g., at the BCE). As will be described below, a global history table H can be kept at the SCE. For each line L, H[L] is used to indicate the information for line L in table H. When there is a table for each CP, $H_i$ is used to denote the history table for processor $CP_i$. Two types of histories (storage of which is illustrated at 710 of FIG. 7) may be kept at H:

(i) XI-Invalidates—At each H[L], a record is kept, as to whether L was XI-invalidated without refetching.

(ii) $CH_{Loc}$—At each H[L], a record is kept of the Change-Local history; i.e., whether L was stored into since the last fetch.

In the following, evaluation results on different algorithms are presented. Simulations were done using a two-way MP (2WMP) memory reference trace. Only 512K processor cache memory with four-way set-associativity and 64 byte lines were considered. The base MP algorithm simulated was read only (RO) aggressive, but with conditional exclusive (EX) D-fetches (i.e., D-fetch EX when the line is not in any cache). With UP and 2WMP configurations, the results shown in FIG. 2 were obtained on cache misses (not counting XI-activities), where the superscript IF indicates instruction fetches, the superscript DF indicates data (operand) fetches, and the superscript DS indicates data (operand) stores. Close to three fourths of $\Delta_2(m)(=131.7)$ was due to D-fetches, with close to one fourth due to D-stores.

Figure 3:
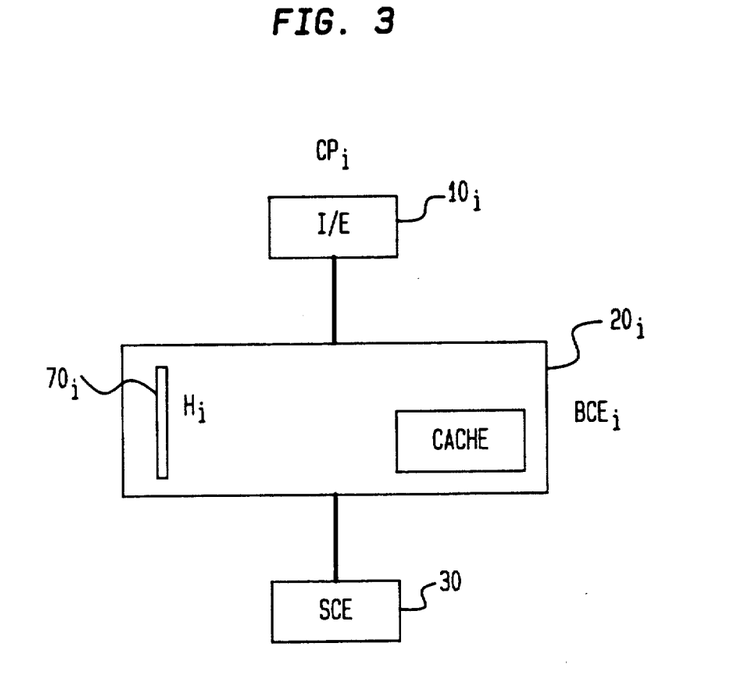
FIG. 3 is a block diagram showing an organization of a MP system in which local history tables are maintained.

FIG. 3 illustrates an organization in which the BCE $20_i$ of each CP, $10_i$, maintains a local history table $H_i$, $70_i$, for data prefetching purposes. All lines in the main storage (MS) are grouped into fixed size blocks, with each block containing T consecutive lines. For each line L, $B_L$ denotes the block covering line L. The invention will be illustrated by first considering each $H_i$ as an Invalidate History Table. Each $H_i$ is a bit-vector of fixed size. For each memory line L, a bit entry $H_i[L]$ is set via the line address. Initially, all bits of $H_i$ are reset to zero.

(a) The bit $H_i[L]$ is set (turned on) when the BCE invalidates L from its cache through a remote request.

The bits of $H_i$ are turned off in the following situation:

(b) the bit $H_i[L]$ is reset when the line L is fetched into the cache of $CP_i$ as a D-line.

Figure 8:
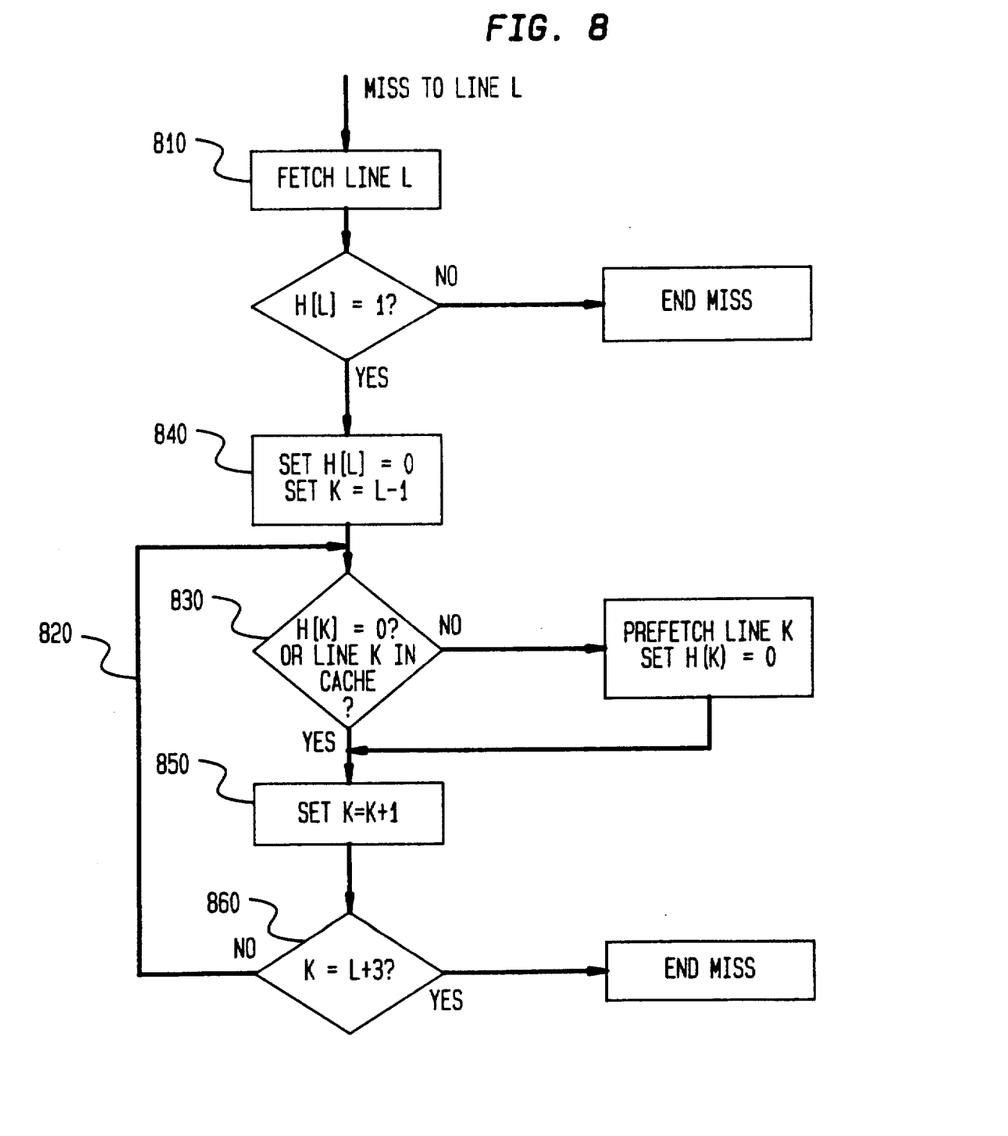
FIG. 8 illustrates operation of the invention in connection with history information in accordance with FIG. 7.

Upon a D-line miss in the cache of $CP_i$, the BCE carries out prefetch decisions as follows:

(c) Each line L' in block $B_L$ (including L itself) will be fetched, starting with line L, into cache if the bit $H_i[L']$ is set and if the line L' is not resident in the cache. In a preferred embodiment, the block $B_L$ consists of the line sequentially preceding line L (840 of FIG. 8) and the next two lines sequentially following the line L (850 and 860 of FIG. 8).

In principle, the Invalidate History Table $H_i$ monitors those D-lines that are invalidated from the local cache and triggers prefetch operations when a D-miss occurs.

Figures 2, 4:
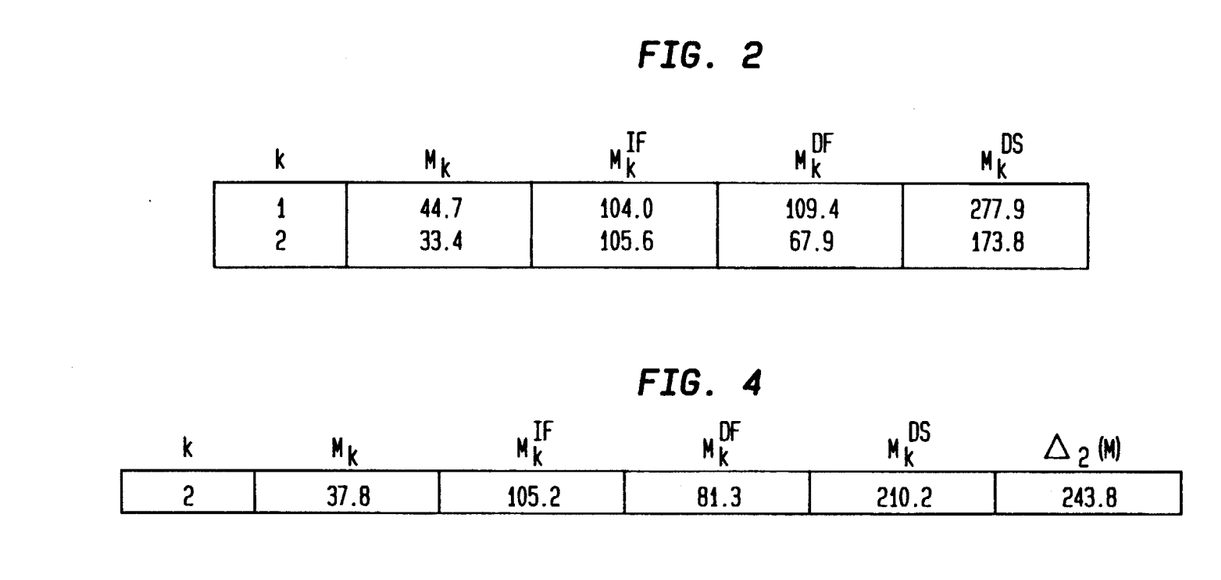
FIG. 2 is a table showing the results on level one misses with UP and 2WMP configurations.
FIG. 4 is a table showing the results using local hash tables. for each history table $H_i$.

In the experiments, a hash table for each $H_i$ with 32K entries was used. Each entry in the hash table was a single bit. If the number of consecutive lines T=4, the results shown in FIG. 4 are obtained. These results show a reduction of $\Delta_2(m)$ by 47.3% over the standard MP design without data prefetching. Furthermore, among the D-misses (once every 58.7 instructions), only 21.4% (once every 274.2 instructions) resulted in effective data prefetches (i.e., those with at least one nondemanded line prefetched). Among the effective data prefetches, 72.6% (93.2%, respectively) result in the prefetch of only one line (up to two lines, respectively), with an average of 1.14 lines prefetched each time.

Figure 5:
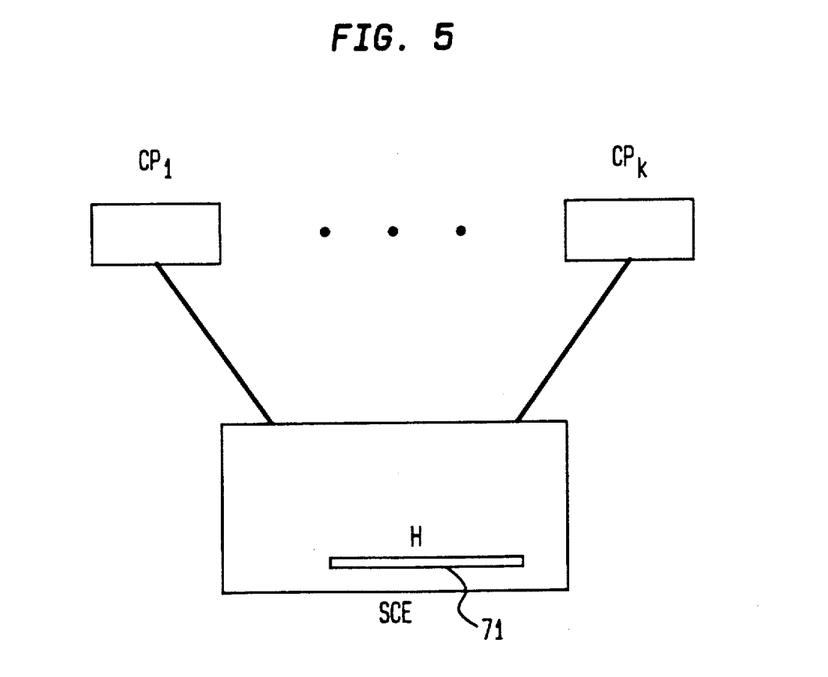
FIG. 5 is a block diagram showing an organization of a MP system in which a global history table is maintained.

In the above experiment, if a single hash table H at, for example, the SCE is used instead of one for each CP, results are obtained which are very close to what is observed with local XI-invalidate tables. FIG. 5 illustrates the organization for such a design. The operations for D-prefetch with a global Invalidate History Table H, 71, is very similar to the ones with local tables:

(d) The bit H[L] is set when the SCE issues an XI-invalidate of L to any of the CPs due to a request from a CP (which itself may cause a miss fetch).

(e) The bit H[L] is reset when the line L is fetched into a CP cache as a D-line. This does not include the situation of a miss fetch described in step (d) above.

(f) Upon a D-line miss fetch from CP, each line L' in block $B_L$ (including L itself) will be fetched (810 of FIG. 8), starting with L (e.g. loop 820 of FIG. 8), into the requesting cache if the bit H[L'] is set and if L' is not resident there.

In step (f) above, the SCE may filter out unnecessary prefetching (of the lines that are already in the target CP cache) by examining (830 of FIG. 8) the corresponding copy directory. In certain designs in which the SCE does not maintain resident information for local caches, the BCE may simply send the SCE a tag, along with the D-miss request, indicating its cache residency of those lines in the associated block $B_L$.

In MP cache designs, an XI-invalidate operation may be activated on an anticipatory basis. For instance, in IBM 3081 and 3090 systems, a D-fetch miss from a CP may trigger XI-invalidate of the line in a remote cache, anticipating subsequent stores into the line after the current D-fetch operation. It is possible for the history table H to monitor only D-store activities (versus XI-invalidate activities). For instance, for a global history table H described above, step (d) may be replaced with step (d') as follows:

(d') The bit H[L] is set when the SCE receives a D-store of L (which itself may cause a miss fetch) from any of the CPs.

Figure 6:
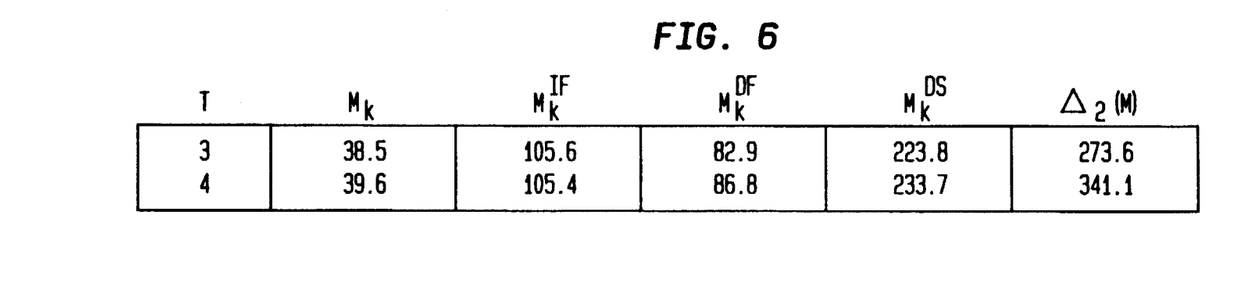
FIG. 6 is a table showing the results using a global table H.

In this case, H is simply a global Change-Local history table which monitors those lines that are actively modified currently. Simulation results of D-prefetching with a global Change-Local history table H are summarized in FIG. 6. As the number of CPs grows, it can be burdensome for the SCE to check the global Change-Local history table H for each D-store from the CPs. This burden may be reduced through various design techniques. For instance, as described in Flusche et al U.S. Pat. No. 4,391,731, exclusivity (EX) locking may be used for modern MP cache coherence control. Each D-store is required to obtain EX status on the line first, which will guarantee that the line be XI-invalidated from remote caches. Hence, step (d') may be implemented such that H[L] is set only upon the first D-store to line L after the requesting CP obtains EX status on the line L. It is unnecessary for the SCE to set the entry H[L] upon subsequent D-stores since the entry is already set by earlier D-stores in normal conditions. We also notice that, since H is only used as a device for assisting prefetch decisions, it is not necessary to precisely maintain H according to strict rules upon situations that may complicate the design. With the number of consecutive lines T=3 (T=4, respectively), $\Delta_2(m)$ was reduced by 51.9% (61.4%, respectively) with 207.56 (201.46, respectively) instructions per effective prefetching, and with an average of 1.4 (1.7, respectively) lines prefetched for each effective prefetch. Comparing these results with those for local history tables, we find that the global history table approach generally performs better. This is partly due to the fact that a global directory can generally better capture the tendency of the line being reused dynamically.

From the results on a 2WMP system, extra cache misses due to XI-invalidates were substantially reduced. A greater performance benefit can be obtained with more processors in the MP system. One important factor in the results is the relatively low frequencies (more than 200 instructions per occurrence) of effective prefetch. As a result, it is possible to prefetch more than one line each time. Such multiple data prefetches are more appropriate in an environment in which line fetch bandwidth is very wide (e.g., one line per cycle). The prefetched lines may be moved into a stage buffer waiting for cache putaways (and possibly cache directory lookups also). Even when more CPs are involved, a drastically higher data prefetch rate is not expected, since the prefetching is done only on cache misses.

Two mechanisms have been described for maintaining the histories for D-prefetching, one with local XI-invalidate histories and the other with global Change-Local history. Depending upon particular implementations, these histories or other similar ones may be used with various combinations. It is worth noticing that such a history itself may serve the purpose for other kinds of cache optimizations. For instance, the Change-Local histories (either local or global) may provide information for the optimization of cache status assignments in MP cache designs as described in co-pending patent application Ser. No. 07/232,711, filed Aug. 16, 1988, by Lishing Liu, for "An Improved Multiprocessor" Lishing Liu for "An Improved Multiprocessor Cache Using a Local Change State".

Data prefetching in MPs is normally associated with the increase of XI activities. However, the subject invention significantly improves XI problems with proper coherence mechanisms.

While the invention has been described in terms of two preferred embodiment, those skilled in the art will recognize that the invention can be practiced with modification within the spirit and scope of the appended claims.

Having thus described my invention, what I claim as new and desire to secure by Letters Patent is as follows:

1. In a multi-processor system comprising a plurality of processors, a shared main storage and a storage control element, each said processors having a local cache memory and a buffer control element, a computer implemented method of data prefetching comprising the steps of:

establishing a local history table at each of said processors, each said local history table containing for each line in cache memory a record of one of whether said line was cross-interrogate invalidated without refetching said line from said shared main storage and whether said line was stored into by the processor corresponding to each said local history table since a last fetch of said line;

setting an entry in said local history table when one of
a) said line is cross-interrogate invalidated from any processor and
b) the buffer control element receives a data store for said line occurs, corresponding to said record in said local history table, and resetting said entry corresponding to said record in said local history table when said processor fetches said line into its cache memory from said shared main storage; and examining entries in said local history table for selected lines which have addresses having a predetermined relationship to a particular line to be accessed by the processor corresponding to said local history table, said predetermined relationship indicating an increased likelihood of a respective one of said selected lines being required, and when
a) said particular line is not available in said local cache memory and
b) said local history table contains at least one entry which is set corresponding to a respective one of at least one selected line having said predetermined relationship to said particular line, fetching said particular line and prefetching only ones of said selected lines having said predetermined relationship to said particular line and also correspond to ones of said entries in said local history table which are set.

2. The method of data prefetching recited in claim 1 wherein said main storage is divided by blocks, each block containing lines of data, and the step of prefetching is performed by prefetching selected lines of a block of data from said main storage containing said line to be accessed.

3. The method of data prefetching recited in claim 2 wherein said selected lines of data comprises a line sequentially preceding said line and two lines next sequentially following said line to be accessed.

4. The method of data prefetching recited in claim 1 wherein said step of establishing local history tables is performed by storing said local history tables in the buffer control elements for each said processors.

5. In a multi-processor system comprising a plurality of processors, a shared main storage and a storage control element, each of said processors having a local cache memory and a buffer control element, a computer implemented method of data prefetching comprising the steps of:

establishing a history table at said storage control element, said history table containing for each line in said cache memories of said processors a record of one of whether said line was cross-interrogate invalidated without refetching said line from said shared main storage and whether said line was stored into since the last fetch of said line by a particular processor;

setting an entry in said history table when one of
a) said line is cross-interrogate invalidated from any processor and
b) the buffer control element of said particular processor receives a data store for said line occurs, corresponding to a record in said history table, and resetting the entry when said particular processor fetches said line into its cache memory from said shared main storage; and, examining entries in said history table for selected lines which have addresses having a predetermined relationship to a particular line to be accessed by the processor corresponding to said history table, said predetermined relationship indicating an increased likelihood of a respective one of said selected lines being required, and when
a) said particular line is not available in said local cache memory of said particular processor and
b) said history table contains at least one entry which is set corresponding to a respective one of at least one selected line having said predetermined relationship to said particular line, fetching said particular line and prefetching only ones of said selected lines having said predetermined relationship to said particular line and also correspond to ones of said entries in said history table which are set.

6. The method of data prefetching recited in claim 5 wherein said main storage is divided by blocks, each block containing lines of data, and the step of prefetching is performed by prefetching selected lines of a block of data from said main storage containing said line to be accessed.

7. The method of data prefetching recited in claim 6 wherein said selected lines of data comprises a line sequentially preceding said particular line and two lines next sequentially following said particular line to be accessed.

8. In a multi-processor system comprising a plurality of processors, a shared main storage and a storage control element, each of said processors having a local cache memory and a buffer control element, a computer implemented method of data prefetching comprising the steps of:

establishing a history table at said storage control element, said history table containing for each line in said cache memories of said processors a record of one of whether said line was cross-interrogate invalidated without refetching said line from said shared main storage and whether said line was stored into since the last fetch of said line by a particular processor;

setting an entry in said history table when one of
a) said line is cross-interrogate invalidated from any processor and
b) the storage control element of said particular processor receives a data store for said line occurs, corresponding to a record in said history table, and resetting said entry when said particular processor fetches said line into its cache memory from said shared main storage; and, examining entries in said history table for selected lines which have addresses having a predetermined relationship to a particular line to be accessed by the processor corresponding to said history table, said predetermined relationship indicating an increased likelihood of a respective one of said selected lines being required, and when
a) said particular line is not available in said local cache memory of said particular processor and
b) said history table contains at least one entry which is set corresponding to a respective one of at least one selected line having said predetermined relationship to said particular line, fetching said particular line and prefetching only ones of said selected lines having said predetermined relationship to said particular line and also correspond to ones of said entries in said history table which are set.

9. The method of data prefetching recited in claim 8 wherein said main storage is divided by blocks, each block containing lines of data, and the step of prefetching is performed by prefetching at least one selected line of data from said main storage containing said line to be accessed.

10. The method of data prefetching recited in claim 9 wherein said selected lines of data comprise a line sequentially preceding said particular line and two lines next sequentially following said particular line to be accessed.

11. A multi-processor data processing system having a plurality of processors, a shared main storage and a storage control element, each of said processors in said multi-processor data processing system having a local cache memory and a buffer control element, said multi-processor data processing system including a history table containing an entry for each line of at least one of said local cache memories, means for setting an entry in said history table upon the occurrence of at least one of a cross-interrogate invalidate of the line corresponding to said entry in said at least one of said cache memories and a data store for the line corresponding to said entry in said at least one of said cache memories, means for resetting said entry when a processor associated with said at least one cache memory fetches said line into its cache memory from said shared main storage, means for detecting that a particular line is unavailable to a processor from its cache, and means for fetching said particular line and means for prefetching only selected lines from said shared main storage which correspond to ones of said entries in said history table which are set and also which have a predetermined relationship to said particular line, said predetermined relationship indicating an increased likelihood of said line being required.

12. A multi-processor data processing system as recited in claim 11, wherein said history table is a local history table containing an entry for each line in said cache memory of at least one processor of said multi-processor data processing system.

13. A multi-processor data processing system as recited in claim 11, wherein said history table is a global history table containing an entry for each cache memory of each of said processors of said multi-processor data processing system.

14. A multi-processor data processing system as recited in claim 13, wherein said means for setting an entry in said global history table includes means for setting said entry when a line corresponding to said entry is cross-interrogate invalidated from any processor.

15. A multi-processor data processing system as recited in claim 11, wherein said predetermined relationship to said particular line defines a block of consecutive lines.

16. A multi-processor data processing system as recited in claim 15, wherein said block of lines includes a line preceding said particular line and two lines following said particular line.

17. A multi-processor data processing system as recited in claim 11, wherein at least one said buffer control element contain said history table.

* * * * *